Feb. 6, 1968 G. L. MILLER ETAL 3,368,066

FAST MULTIPLIER EMPLOYING FIELD-EFFECT TRANSISTORS

Filed Feb. 14, 1964 3 Sheets-Sheet 1

INVENTORS
GABRIEL L. MILLER
VELJKO RADEKA
BY

Feb. 6, 1968 G. L. MILLER ETAL 3,368,066

FAST MULTIPLIER EMPLOYING FIELD-EFFECT TRANSISTORS

Filed Feb. 14, 1964 3 Sheets-Sheet 2

INVENTORS
GABRIEL L. MILLER
VELJKO RADEKA

BY

Roland A. Anderson
Attorney

FAST MULTIPLIER EMPLOYING FIELD-EFFECT TRANSISTORS

Filed Feb. 14, 1964

INVENTORS
GABRIEL L. MILLER
VELJKO RADEKA
BY
Roland A. Anderson
attorney

United States Patent Office 3,368,066
Patented Feb. 6, 1968

3,368,066
FAST MULTIPLIER EMPLOYING FIELD-EFFECT TRANSISTORS

Gabriel L. Miller, Westfield, N.J., and Veljko Radeka, East Patchogue, N.Y., assignors to the United States of America as represented by the United States Atomic Energy Commission Filed Feb. 14, 1964, Ser. No. 345,055
5 Claims. (Cl. 235—194)

ABSTRACT OF THE DISCLOSURE

A transistorized circuit utilizing field effect transistors for multiplying a pair of parameters represented by voltages applied to the drain and gate contacts of these transistors. The output is in the form of current whose magnitude is a function of this product.

The invention described herein was made in the course of, or under a contract with the U.S. Atomic Energy Commission.

This invention relates to electronic fast multiplier circuits and more particularly to electronic fast multiplier circuits employing field-effect transistors.

A well known electronic technique of obtaining fast multiplication is to employ a pair of so-called squaring amplification tubes coupled to two input circuits to obtain outputs representing $(A+B)^2$ and $(A-B)^2$ where A and B represent the two input potentials to be multiplied. By arrangement of the circuitry interconnecting the output of the two squaring tubes, it then becomes possible to subtract the aforementioned outputs. Simple algebra shows the result to be 4AB, or a direct function of the final product AB desired. While the described arrangement is accurate, it is complex and slow. Squaring diodes can be substituted for the amplification tubes but these are of limited useful range and accuracy.

Another arrangement generates a pulse-signal made up of rectangular pulses repeated at a constant rate whose time widths are varied proportional to one input potential A as the heights are varied proportionally to the other input potential B. Rectification of the resultant pulse-signal results in the generation of a potential proportional to the product of the input potentials. This technique also involves special costly electronic tubes and suffers additionally from the fact that special techniques are required to adapt it for use in high speed pulse multiplication applications where multiplication times on the order of a micro-second are required.

The present invention overcomes the various deficiencies of the previously described fast multiplication circuits by utilizing the so-called field-effect transistor to effect the desired multiplication. This transistor is basically a variable conductance controlled by the reverse bias of the gate-channel junction. For signals small compared to the device saturation voltage, analogue multiplication based on proportionality of channel conductance to gate voltage is possible. The multiplication principle described herein has the advantage of high accuracy, speed, stability and simplicity.

It is thus a first object of this invention to utilize a field-effect transistor to obtain the fast multiplication of a pair of input signals.

It is another object of this invention to utilize the variable conductance characteristics of certain transistors to produce analogue multiplication.

Another object is a bridge circuit utilizing field effect transistors which is inherently temperature compensated.

Still another object of this invention is a bridge circuit of four transistors not requiring symmetrical driving of the transistors.

Other objects and advantages of this invention will hereinafter become obvious from the following description of preferred embodiments of this invention taken with the accompanying drawings in which:

FIG. 1 illustrates schematically an idealized section of a typical field-effect transistor;

FIGS. 2*a* and 2*b* illustrate graphically the principal characteristics of a field-effect transistor;

Figure 1:
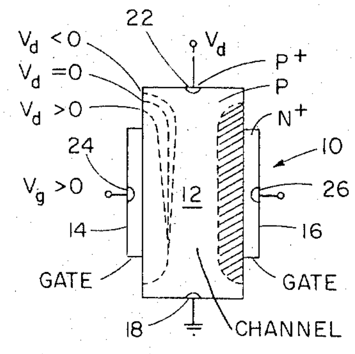

Referring to FIG. 1, there is shown, somewhat schematically, an idealized cross-sectional view of a symmetrical field-effect transistor 10 consisting of an acceptor, or P-type, region 12 and a pair of donor, or N-type, gate regions 14 and 16. Field-effect transistor 10 is provided with a source contact 18, a drain contact 22, and a pair of gate contacts 24 and 26 as illustrated. As field-effect transistor 10 shown is symmetrical, then the source and drain contacts are reversible and these designations indicate merely their function in the circuit. As is understood in the art, a small change in gate voltage will produce a relatively large change in channel current. A fuller description of this effect is given in W. Schockley, Proc. IRE, 40, pp. 1365–1376, November 1952 and Bockemuehl, R.R. IEEE Trans. on Electron Devices, ED–10 (1963), pp. 31–34.

Figure 2A:
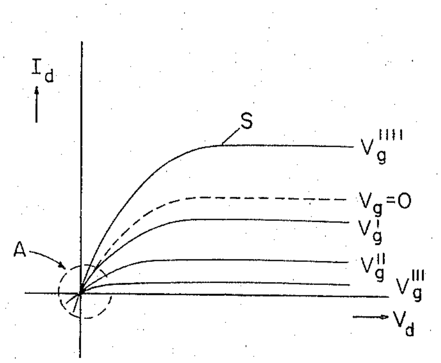
Figure 2B:
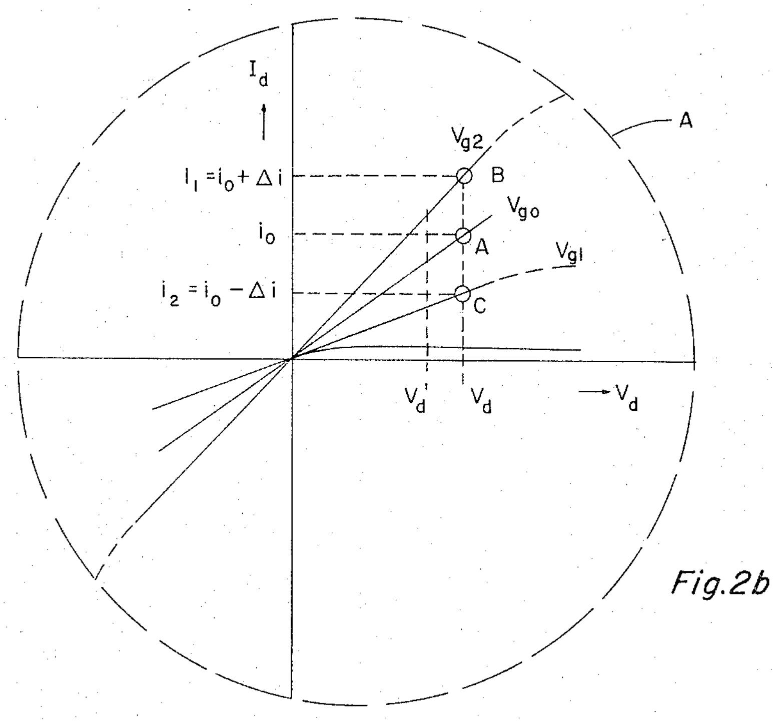

Referring back to FIG. 1, field-effect transistor 10 is reverse-biased by the application of a negative voltage $Vd$ to the drain contact 22, a positive gate voltage $Vg$ on gate contacts 24 and 26, and source contact 18 held at a constant zero or ground potential. The principal and qualitative characteristics of the field-effect transistors are shown in FIGS. 2*a* and 2*b*. The channel current ($Id$) is proportional to the product of the gate voltage variation ($\Delta Vg$) and the channel voltage ($Vd$), within the linear region of the transistor as shown in FIG. 2*b*, and is obtained in accordance with this invention as the difference of currents of two devices for gate voltage variations of the opposite sign, as illustrated graphically by the triangle OBC in FIG. 2*b*. By linear region is meant that the transistor is being operated in the region illustrated in FIG. 2*b* and also in a range of grid voltages or conductances wherein a change in grid voltage produces a linear change in channel current.

Assume that (1) $Vg_1=Vg_0-\Delta Vg$ and (2) $Vg_2=Vg_0+\Delta Vg$

Then, $\Delta i$ is proportional to $\Delta Vg$ within the range of transistor operation specified and for a particular $Vd$, so that $\Delta i=K\Delta Vg$ where K is a suitable constant.

Consider a pair of similar field-effect transistors operating in parallel with a common $Vd$, producing a differential current output $\Delta i$. Then (3) $i_1-i_2=(i_0+\Delta i)-(i_0-\Delta i)=2\Delta i$ (4) $2\Delta i=K\Delta Vg+K\Delta Vg=2K\Delta Vg$ In other words, it will be seen that the differential current output of a pair of field-effect transistors operating in the particular range specified will be proportional to $Vg$ for a constant $Vd$. Furthermore, it is also apparent, that as long as both transistors have a common $Vd$ and the curves illustrated are straight lines then the $\Delta i$ output will be proportional to any changes in $Vd$, such as going from $Vd$ to $Vd'$. Thus, the output is proportional to the product of V*d* and V*g* within the linear ranges of V*d* and V*g* shown in FIG. 2*b*.

Figures 3, 4, 5, 6:
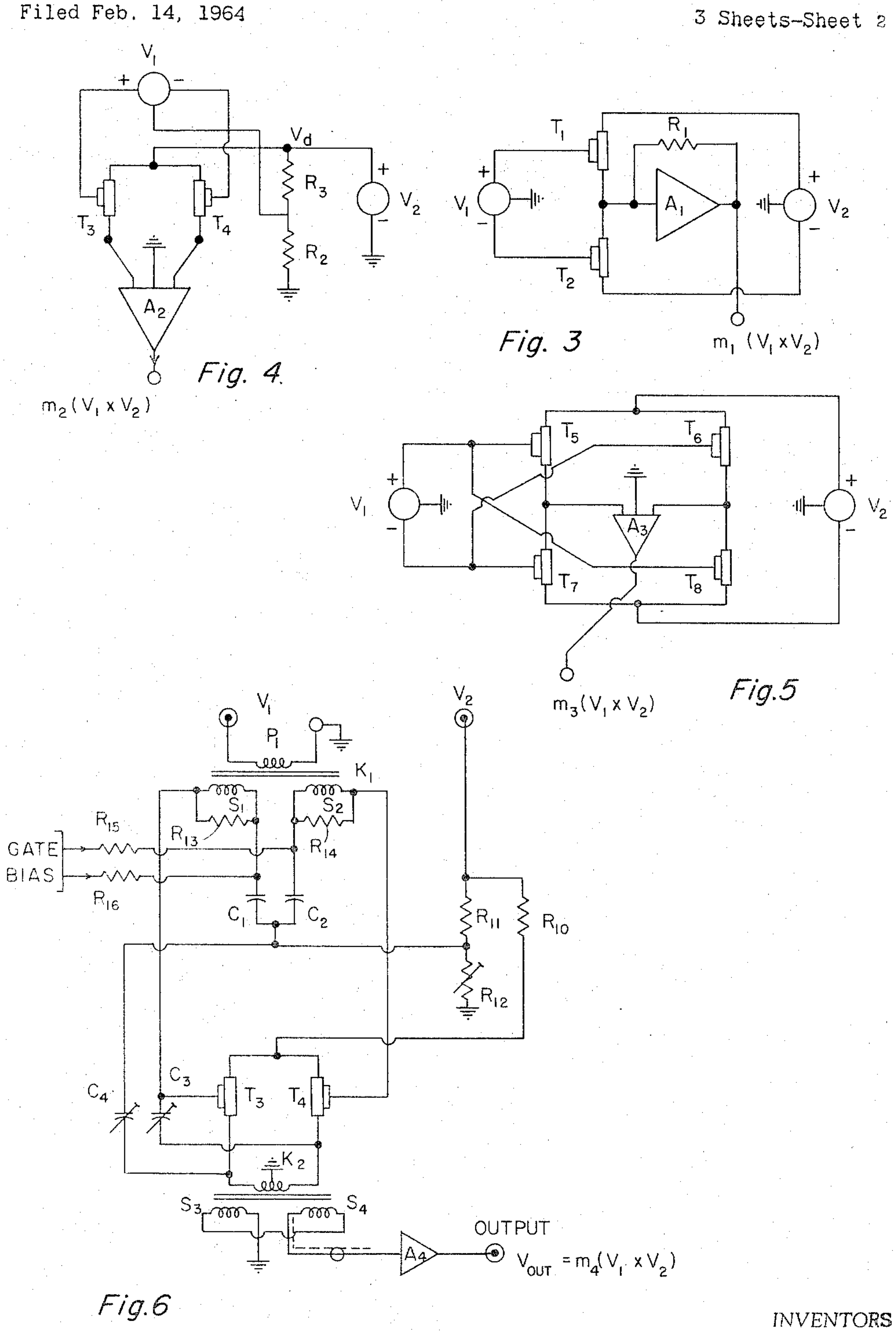
FIG. 3 shows schematically a basic circuit exhibiting the principles of this invention.
FIG. 4 is a practical arrangement embodying features to eliminate channel non-linearities.
FIG. 5 is an arrangement combining the features of the circuits shown in FIGS. 3 and 4.
FIG. 6 is a typical detailed circuit useful for the schematic arrangement shown in FIG. 3.

An embodiment of this invention is shown in FIG. 3. In this arrangement field-effect transistors $T_1$ and $T_2$ are connected in parallel with the voltage source $V_1$ connected across the gate contacts and voltage source $V_2$ connected across the drain contacts as illustrated. Difference current amplifier $A_1$ with resistor $R_1$ takes the outputs from the source contacts and the amplified difference is delivered on contacts $m_1$ as a direct proportion of the product $V_1 \times X_2$. $V_1$ is equivalent to the channel voltage V*d* described in connection with FIG. 1. The drain contacts for transistors $T_1$ and $T_2$ are virtually at ground potential as current amplifier $A_1$ does not have any significant impedance in order to avoid affecting the current flow, as understood in the art. This arrangement, though embodying the principles of this invention would be generally inadequate because the circuit cannot be balanced by biasing. This is due to the fact that the channels of the two transistors are of opposite polarities. Thus, if at zero voltage value of $V_2$, transistors $T_1$ and $T_2$ were biased for zero output, changes in voltage $V_2$ would produce slightly different effects on the channel currents as they would be operating at different points.

A preferred embodiment of this invention avoiding the above problem is illustrated in FIG. 4 wherein is shown a bridge arrangement consisting of a pair of field-effect transistors $T_3$ and $T_4$ connected in parallel. A first source of voltage $V_1$ (i.e., V*g*) representing the first variable is connected across the gate regions of transistors $T_3$ and $T_4$. The drain contacts of these transistors are connected to the positive side of a second voltage source $V_2$ (i.e., V*d*) which has its negative side grounded. A pair of resistors $R_2$ and $R_3$ of equal value are connected across source $V_2$ for a purpose to be later described. The outputs of transistors $T_3$ and $T_4$ are taken from the source contacts and delivered to a current difference amplifier $A_2$ which will produce a current output I*o* which is a direct function of the product of $V_1$ and $V_2$. Assuming that the values of the voltages are such that the transistors $T_3$ and $T_4$ will operate in the linear range as illustrated in FIG. 2*b* and that the relative values of $V_1$ and $V_2$ are such that the transistors are reverse-biased the result will be as indicated.

In order to correct for a relatively high nonlinearity in the drain voltage of the transistors arising out of change in average conductance caused by a voltage drop through the channel, a voltage divider network consisting of resistors $R_2$ and $R_3$ is utilized. The ground return for the gate voltage generator or source $V_1$ is held to ½ of the drain voltage as a result of which the conductance across the channel does not change with the drain voltage.

One of the important features of the embodiment shown in FIG. 4 is that when the channels are current driven the circuit is inherently temperature compensated, or that in other words, the multiplier output is temperature independent. The output is determined only by voltage parameters of the transistors which are practically independent of temperature in a relatively wide range. This result arises out of the fact that changes in temperature do not affect the relative current variation of the two transistors.

While the arrangement just described does reduce the non-linearity in the output, this can also be obtained by providing a circuit which is symmetrical to both variables. Such a circuit is shown in FIG. 5. In this arrangement there are four transistors consisting of the previously described type field-effect transistors $T_5$, $T_6$, $T_7$ and $T_8$. Source $V_1$ is connected across the gates of transistors $T_5$ and $T_7$, and that of $T_6$ and $T_8$, respectively, as shown. Source $V_2$ is connected across the source electrodes of transistors $T_5$, $T_6$ and $T_7$, $T_8$. Current difference amplifier $A_3$ takes the outputs of $T_5$, $T_7$ and $T_6$, $T_8$ to amplify the current differences and produces an output on contact $m_3$ which is a direct function of the product of $V_1$ and $V_2$. It will be seen that transistors $T_5$, $T_6$ are arranged in parallel, as in FIG. 4 while the transistor pairs $T_5$, $T_7$ and $T_6$, $T_8$ are connected as in FIG. 3, thus combining in effect the advantages of both the previously described configurations.

As an example of the circuit described and shown schematically in FIG. 3 reference is made to FIG. 6 for a detailed arrangement utilizing channel current driving. In this figure are shown transistors $T_3$ and $T_4$ as before in parallel with the drain electrodes connected in parallel through a resistor $R_{10}$ to the input voltage source $V_2$. Resistor $R_{10}$ is very large in comparison to the resistances of transistors $T_3$ and $T_4$ causing the latter to be current driven. Source $V_1$ supplies its signal through a transformer $K_1$ across the gate electrodes of transistors $T_3$ and $T_4$. Transformer $K_1$ is provided with a single primary coil and a pair of secondary coils, $S_1$ and $S_2$, one for each of the gate electrodes. An intermediate voltage level for the secondary coils is fixed by a voltage divider network consisting of resistors $R_{11}$ and $R_{12}$ connected between $V_2$ and ground. A pair of capacitors $C_1$ and $C_2$ of identical values block D.C. and low frequency signals to transformer $K_1$ and permit separate bias adjustment of transistors $T_3$ and $T_4$. A pair of resistors $R_{13}$ and $R_{14}$ are placed across secondary coils $S_1$ and $S_2$, respectively, to insure a voltage drop for the low frequency component and to provide transformer damping. The bias signals are inserted through resistors $R_{15}$ and $R_{16}$. The output of transistors $T_3$ and $T_4$ is placed across the primary coil of a differential transformer $K_2$ which is provided with a pair of oppositely arranged secondary coils $S_3$ and $S_4$ in series connected between ground and amplifier $A_4$.

In the operation of the circuit shown in FIG. 6, the gate bias for each of transistors $T_3$ and $T_4$ is adjusted separately. Provision is made in this circuit as already noted to accomplish this for balancing the conductances of the transistors. This would be adjusted at $V_2$ max. and $V_1=0$. The capacitive residual signal for $V_1$ max. and $V_2=0$ is balanced to a minimum by a capacitor $C_3$ connected between the gate of transistor $T_3$ and the drain of transistor $T_4$. Capacitor $C_4$ is introduced in the line between the drain of transistor $T_3$ and common point of resistors $R_{11}$ and $R_{12}$ to balance out the effect of capacitor $C_3$ for $V_2$ max. and $V_1=0$. With transistors $T_3$ and $T_4$ operated in their linear ranges as described previously the differential current output as amplified in current amplifier $A_4$ will be a direct function of the product of $V_1$ and $V_2$.

Typical values for the components shown in FIG. 6 are given in the following table.

*Table*

| | |
|---|---|
| $R_{10}$ | 8K. |
| $R_{11}$ | 1.5K ohms. |
| $R_{12}$ | 100. |
| $R_{13}$, $R_{14}$ | 200. |
| $R_{15}$, $R_{16}$ | 2K. |
| $C_1$, $C_2$ | 0.1 $\mu$f. |
| $C_3$, $C_4$ | 4–30 pf. |
| $K_1$ | 7:1 primary 56 turns, secondary 8+8 turns. |
| $K_2$ | Differential transformer, primary 5 turns, secondary 2.5+2.5 turns. |
| $V_1$, $V_2$ | 5 v. max., V*o* approx. 200 mv. |
| $T_1$, $T_2$ | 2N 2608 (P channel). |

In the arrangement shown in FIG. 6, just described, the solution time is quite fast as mentioned. However, the so-called minimum solution time is not attained by that configuration.

The minimum solution time can be defined as the time needed to change the conductance of the field-effect transistor to that required by the accuracy of multiplication, or in other words, the time it takes for the state of the transistors to be changed in response to a change in signal. However, as a change in the gate-channel junction charge is necessary to change the channel conductance, the solution time is determined by the junction charging time. One way of obtaining the minimum solution time, would be to eliminate the junction charging current from the multiplier output, thus reducing the solution time to the fundamental limits of field-effect transistors. An arrangement of this type is shown in FIG. 7.

There it will be seen that the multiplier is a modification of the multiplier shown in FIG. 6. There are a pair of field-effect transistors $T_9$ and $T_{10}$. The gate contacts of these transistors receive their signals from voltage source $V_1$ through a transformer $K_3$ having a primary coil with a resistive load $R_{20}$ and secondary coils loaded with resistors $R_{22}$ and $R_{24}$. Selective biasing of the grid contacts is obtained from a voltage source $E_1$, a resistor $R_{26}$ and a pair of potentiometers $P_1$ and $P_2$. A pair of capacitors $C_5$ and $C_6$ complete this portion of the arrangement which is quite similar to that of FIG. 6.

The drain inputs to transistors $T_9$ and $T_{10}$ are supplied from source $V_2$ through transformers $K_4$ and $K_5$. Transformer $K_4$ has a primary with a resistor $R_{28}$ and is supplied current through a resistor $R_{30}$. The secondary coil of transformer $K_4$ is center-tapped to ground and provided with a resistor $R_{32}$. Transformer $K_5$ has four primary windings *w1* *w2* *w3* and *w4* arranged in the circuit as illustrated. The output from the secondary of transformer $K_4$ is delivered across the common connection of coils *w1* and *w2* and the common connection of coils *w3* and *w4*. The output from transistors $T_9$ and $T_{10}$ is taken from the secondary of transformer $K_5$ and delivered to current amplifier $A_5$ which produces a signal which is a direct function of the product of voltage inputs $V_1$ and $V_2$. A pair of capacitors $C_7$ and $C_8$ complete this arrangement.

Figure 7:
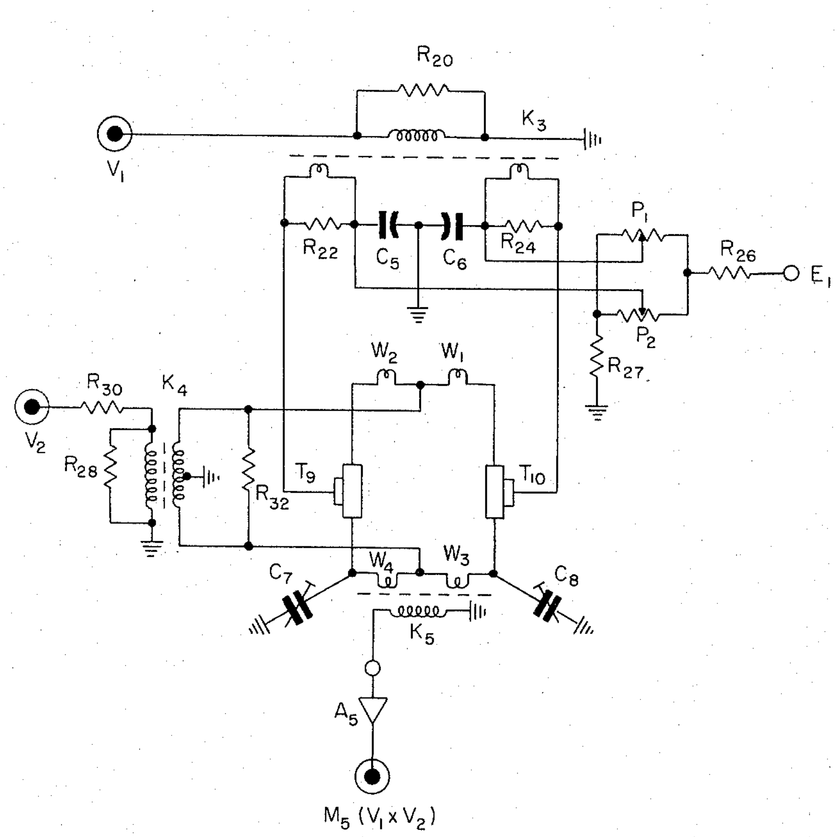
FIG. 7 is a modified arrangement of FIG. 6.

Operation of the circuit illustrated in FIG. 7 is similar to that of the circuit shown in FIG. 6 except that the use of the four-winding transformer $K_5$ and the manner of supplying voltage $V_2$ eliminates charging current from the circuit output. The charging current is equally divided between the channel ends of transistors $T_9$ and $T_{10}$ and cancel each other out. Small charging current differentials due to asymmetrical field-effect transistors do appear at the multiplier output but they are very small and do not effect the result significantly.

The solution times for the circuit described above are much faster than previously used circuits which were referred to earlier. The solution time for the circuit in FIGS. 4 or 6 is about 0.5 $\mu$sec. The solution times for the circuits of FIGS. 5 and 7 can be as short as 0.02 $\mu$sec. In fact the circuit in FIG. 5 can be D.C. coupled as shown so that analogue multiplication in a wide frequency range is possible. Regarding the accuracy of the results obtained with the circuits described above, linearities down to 0.5% can be readily obtained.

Thus it is seen that there has been provided unique electronic arrangements for analogue multiplication utilizing field effect transistors. While several preferred embodiments have been described it is understood that the invention is to be limited only by the appended claims.

We claim:

1. A fast multiplier circuit comprising (a) a pair of field-effect transistors, each of said transistors having a source contact, a drain contact, and at least one gate contact;

(b) a first source of voltage having a positive pole, a negative pole, and a ground return;

(c) means connecting the positive pole of said source to the gate contact of the first transistor and the negative pole of said voltage source to the gate contact of the second transistor;

(d) a second source of voltage;

(e) means connecting one pole of said second voltage source to the drain electrodes of said transistors and grounding the opposite pole of said second voltage source;

(f) means responsive to the differences in currents taken from the source contacts of said transistors producing an output which is a linear function of the product of said first and second voltages.

2. The multiplier circuit in claim 1 having means for holding the ground return of said first voltage source at one half the level of said second voltage source thereby reducing gate and channel voltage differences along the length of the current channels in said transistors.

3. A fast multiplier circuit comprising (a) first, second, third, and fourth field-effect transistors, each of said transistors having a source contact, a drain contact, and at least one gate contact;

(b) a first source of voltage;

(c) means connecting the positive pole of said first voltage source to the gate contact of said first transistor and the gate contact of said fourth transistor;

(d) means connecting the negative pole of said first voltage source to the gate contact of said third transistor and the gate contact of said second transistor;

(e) a second source of voltage;

(f) means connecting the positive pole of said second voltage source to the drain contacts of said first and second transistors;

(g) means connecting the negative pole of said second voltage source to the drain contacts of said third and fourth transistors;

(h) said voltage sources being selected for driving said transistors in the linear range of channel voltage versus channel current;

(i) means comparing the output currents of said first and third transistors and producing a differential current;

(j) means comparing the output currents of said second and fourth transistors and producing a differential current;

(k) and means obtaining the difference between said differential currents which is a linear function of the product of said first and second voltages.

4. A fast multiplier circuit comprising first and second field effect transistors each having a gate, source, and drain contacts, means for supplying a voltage to said drain contacts, means for supplying a potential difference across said gate contacts to control channel current flow through said transistors, means for measuring at said source contacts the differential current flow through said transistors which is a direct function of the product of said voltage and potential difference, and means clamping an intermediate level of said potential difference to an intermediate level of said voltage to minimize non-linearities in channel current flow.

5. The fast multiplier circuit of claim 4 in which transformer means isolates said potential difference from said gate contacts, and means are provided for the separate bias adjustment of each of said gate contacts.

References Cited

UNITED STATES PATENTS

| | | | |
|---|---|---|---|
| 2,661,152 | 12/1953 | Elias | 235—194 |
| 2,855,145 | 10/1958 | Patterson | 235—194 |
| 2,891,726 | 6/1959 | Decker et al. | 235—194 |

MALCOLM A. MORRISON, *Primary Examiner.*

J. F. RUGGIERO, *Assistant Examiner.*